United States Patent [19]

Marsh

[11] Patent Number: 4,688,432
[45] Date of Patent: Aug. 25, 1987

[54] AVERAGING VELOCITY SENSOR FOR MEASURING FLUID FLOW IN A CONDUIT

[76] Inventor: Lawrence B. Marsh, 12842 Littleton St., Silver Spring, Md. 20906

[21] Appl. No.: 833,153

[22] Filed: Feb. 27, 1986

[51] Int. Cl.$^4$ .............................................. G01F 1/58
[52] U.S. Cl. ................................................ 73/861.15
[58] Field of Search ........... 73/861.12, 861.13, 861.14, 73/861.15, 170 A, 195, 432 B

[56] References Cited

U.S. PATENT DOCUMENTS

| | | |
|---|---|---|
| 2,896,451 | 7/1959 | Rinia . |
| 3,007,340 | 11/1961 | Kraftson ........................... 73/432 B |
| 3,693,440 | 9/1972 | Olson . |
| 3,775,673 | 11/1973 | Watanabe . |
| 3,878,715 | 4/1975 | Kobayashi . |
| 4,056,003 | 11/1977 | Zizine . |
| 4,089,218 | 5/1978 | Cushing . |
| 4,122,714 | 10/1978 | Kobayashi et al. . |
| 4,248,086 | 2/1981 | Zizine . |
| 4,308,752 | 1/1982 | Appel et al. ...................... 73/861.12 |
| 4,322,982 | 4/1982 | Muller et al. . |
| 4,389,898 | 6/1983 | Long et al. . |
| 4,459,858 | 7/1984 | Marsh . |

FOREIGN PATENT DOCUMENTS

| | | | |
|---|---|---|---|
| 1914335 | 12/1970 | Fed. Rep. of Germany ... | 73/861.15 |
| 980127 | 1/1965 | United Kingdom ............. | 73/861.15 |
| 1253967 | 11/1971 | United Kingdom ............. | 73/861.15 |

Primary Examiner—Charles A. Ruehl
Attorney, Agent, or Firm—Laubscher & Laubscher

[57] ABSTRACT

A sensor for measuring the mean velocity of fluid flow in a conduit senses flow velocities at a number of locations across the interior of the conduit to yield an accurate mean flow signal. The sensor includes a tubular housing which extends across the interior of the conduit. An electromagnet is arranged in the housing and produces an electromagnetic field in the fluid, the axis of the field extending normal to the direction of fluid flow. A plurality of electrodes are arranged in spaced relation along the length of the housing and in diametrically opposed pairs on opposite sides of the housing. The lines which pass through each electrode pair are arranged perpendicular to the direction of fluid flow. The electrodes produce electrical signals in response to the flow of fluid through the field, with each signal being a function of the velocity of fluid flow adjacent each electrode. The signals are combined to produce the mean flow velocity output signal.

27 Claims, 19 Drawing Figures

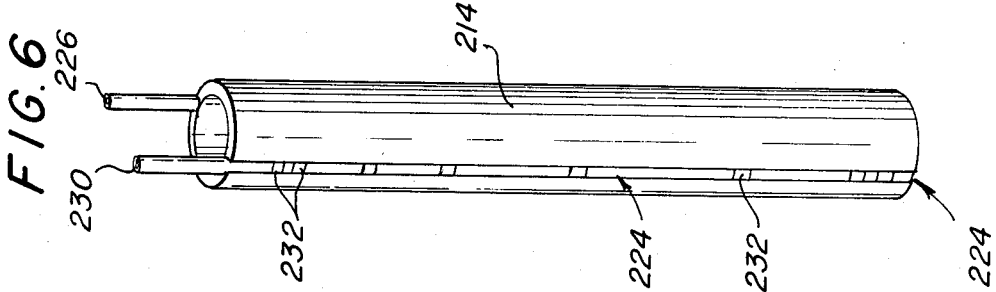
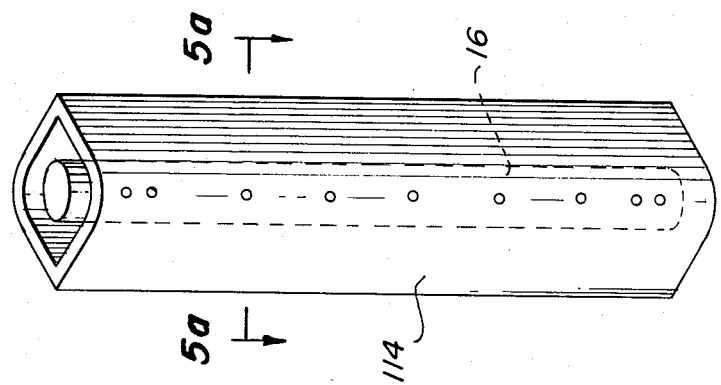
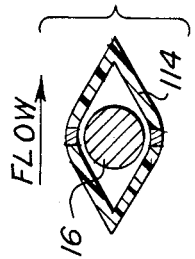
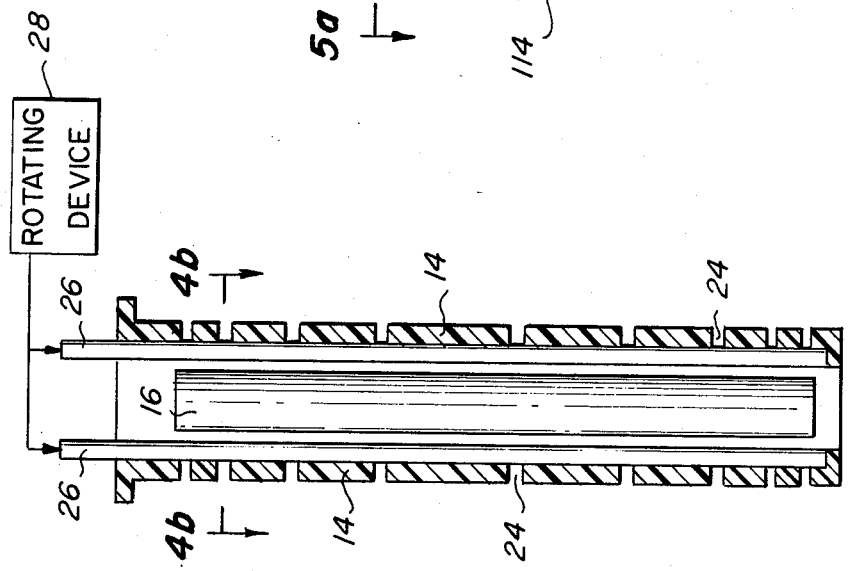
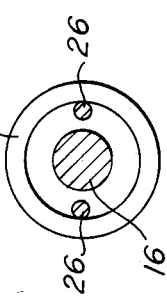
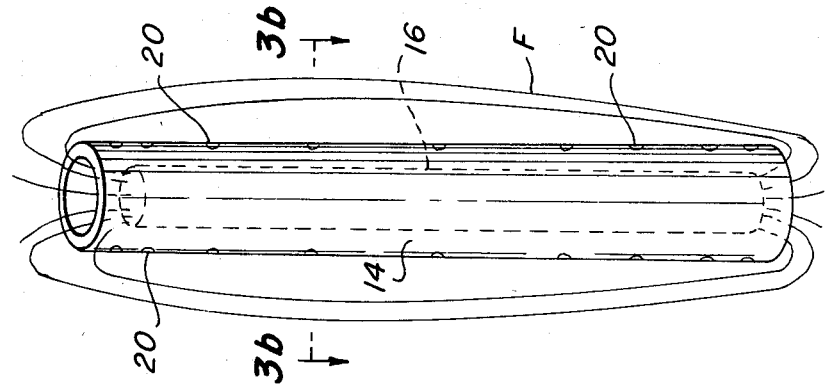
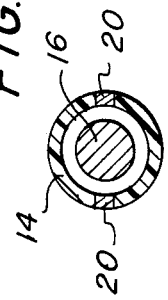

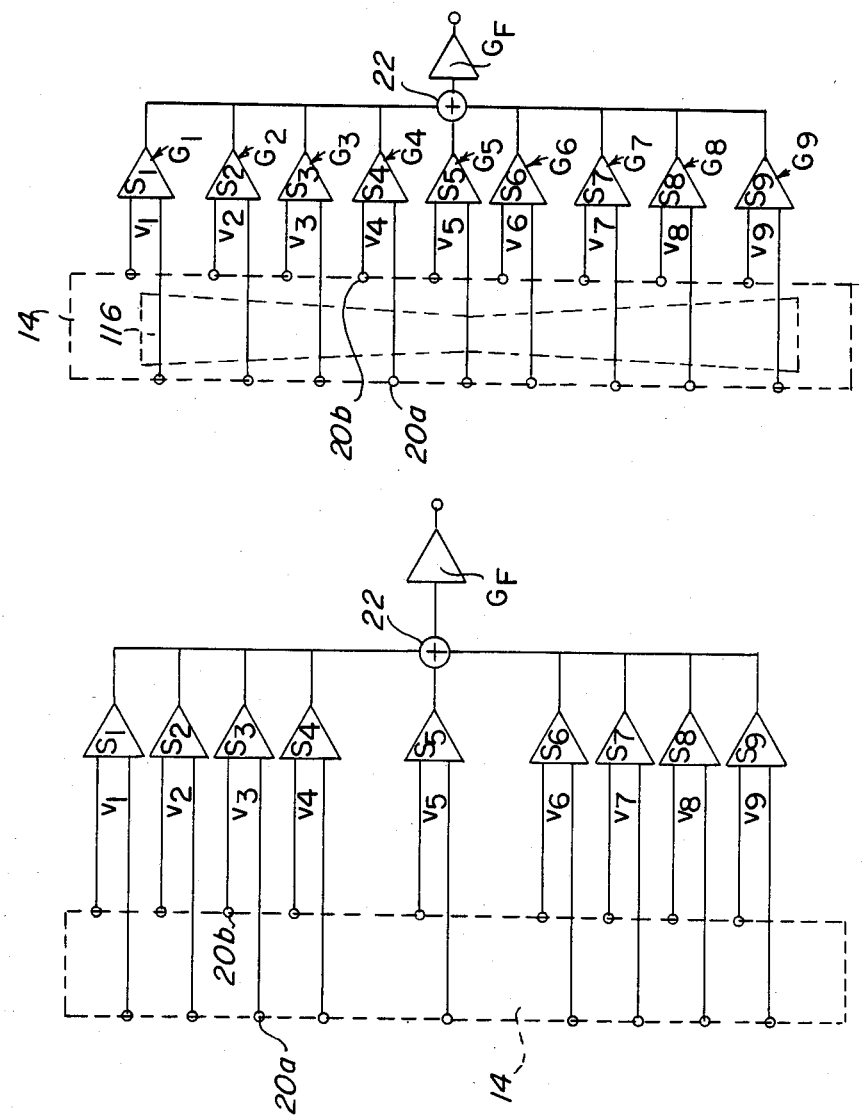
FIG. 9
FIG. 8
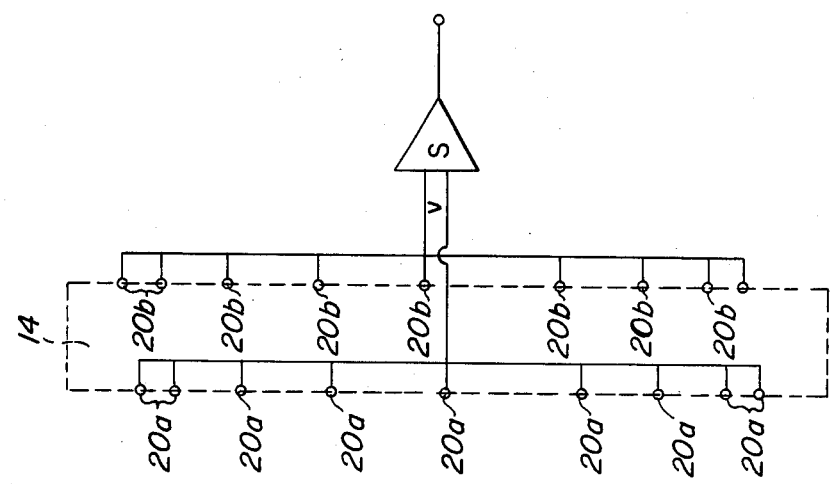
FIG. 7

AVERAGING VELOCITY SENSOR FOR MEASURING FLUID FLOW IN A CONDUIT

BACKGROUND OF THE INVENTION

The measurement of fluid flow in a full conduit is necessary for modern automation of manufacturing plants, as well as for precisely measuring the quantity of flow passing a point such as in the custody transfer of process liquids. The present invention relates to an improved sensor for measuring the average velocity of fluid flow in a conduit by simultaneously sensing the velocity of flow at a number of locations within the conduit and averaging the sensed velocities so that a true flow rate can be determined even though the flow profiles may vary.

BRIEF DESCRIPTION OF THE PRIOR ART

Electromagnetic flowmeters are well-known in the patented prior art as evidenced by the U.S. Pat. No. 3,693,440, to Olson Cushing 4,089,218 and Marsh 4,459,858. The Olson patent, for example, discloses a flowmeter having a spool-type configuration in which a uniform magnetic field is generated in the fluid by a pair of coils lying in a plane on an open cage support. A pair of spaced electrodes are arranged on the support in a plane parallel to the plane containing the coils for measuring the potential gradient in the fluid medium moving through the magnetic field.

The Cushing and Marsh patents each disclose probe type sensors. The Cushing patent, for example, teaches a velocity sensor including a transducer body having two pairs of electrodes extending from the surface of the housing. The pairs of electrodes are arranged 90° around the transducer axis with respect to each other and are staggered by an offset distance along the axis of the transducer. Finally, the Marsh patent, which is assigned to the assignee of the present invention, discloses a point velocity sensor including a probe portion which protrudes into a conduit. The probe includes an electromagnet for generating an electromagnetic field in the fluid and a plurality of electrodes for producing electrical signals in response to the flow of fluid through the field. The signals are converted into a flow velocity output signal by a processing device.

Conventional spool type flowmeters have one pair of electrodes and a magnetic field that is uniform and perpendicular to the flowing fluid and the electrodes. These instruments provide a reasonable integration of the flow passing by the sensor, but are sensitive to flow profiles that are asymmetrical resulting from obstructions in the flow path such as valves, bends, and the like. Thus for spool type meters, calibration depends upon the similarity of the flow profile in the field being similar to that experienced during calibration at the factory. This usually means that the instruments must be placed downstream a distance of between fifteen to thirty times the diameter of the conduit to insure that the flow profiles are uniform and symmetrical.

Conventional probe type flowmeters are essentially point velocity sensors which measure local flow velocity at or near the tip of the sensor. With such an instrument, one can profile the fluid flow, determine its fluid characteristics, and then calculate the flow. The instrument can thus be calibrated on site. Such an instrument can be used in both clean and dirty fluids. However, when used in dirty fluids, the sensor must be placed at a location near the conduit wall to minimize or eliminate the collection of debris. Shifts in flow profile due to changing flow rates or obstructions in the flow path cause shifts in calibration because the relationship between the sensed velocity and the mean flow velocity will have changed.

The present invention was developed in order to overcome these and other drawbacks of the prior devices by providing an improved averaging velocity sensor which accurately reflects changes in flow profile by sensing flow velocity at plurality of locations across the cross-sectional area of the conduit within which the fluid flows.

SUMMARY OF THE INVENTION

Accordingly, it is a primary object of the present invention to provide a sensor for measuring the average velocity of fluid flow in a conduit including a tubular housing which extends across the interior of the conduit and within which is provided an electromagnet for generating a magnetic field in the fluid having a field axis which extends normal to the direction of fluid flow. A plurality of electrodes are arranged in spaced relation along the length of and adjacent the outer surface of the housing. The electrodes are further arranged in diametrically opposed pairs with the lines passing through the pairs of electrodes being arranged perpendicular to the direction of fluid flow. The electrodes produce electrical signals in response to the flow of fluid through the magnetic field, each of the signals being a function of the velocity of fluid flow adjacent each electrode. In this manner, a plurality of discrete flow velocity signals are generated simulatenously at a plurality of locations across the area of the conduit. The electrical signals are delivered to an amplifier where they are combined to produce an average flow velocity output signal.

In accordance with one embodiment of the invention, the conduit has a circular cross-sectional configuration and the housing is arranged along the conduit diameter. The pairs of electrodes are arranged in concentric annular segments within the interior of the conduit, respectively, with the cross-sectional area of each annular segment being equal.

In accordance with another object of the invention, the electrodes are formed from a pair of parallel rods arranged adjacent the inner surface of the housing and extending parallel to the housing axis. The housing contains a plurality of openings adjacent the rods, whereby the portion of each rod adjacent each opening produces the electrical signal in response to the flow velocity adjacent thereto.

According to another object of the invention, the rods are removably and rotatably connected with the housing. In this manner, the rods may be rotated relative to the housing to expose clean unused portions of the rods to the openings in the housing. After the electrode rods have become worn through continued use, the used rods may be replaced with clean rods.

In accordance with another embodiment of the invention, the housing is mounted on a generally cylindrical spool member having an inner diameter corresponding with the inner diameter of the conduit. The spool member is arranged between and affords fluid flow between segments of the conduit.

According to other objects of the invention, the housing mounted in the spool member has I, H, Y, or cross-shaped configurations.

BRIEF DESCRIPTION OF THE FIGURES

Other objects and advantages of the invention will become apparent from a study of the following specification when viewed in the light of the accompanying drawing, in which:

FIGS. 3a and 3b are perspective and sectional views, respectively, of a preferred configuration of the sensor.

FIGS. 4a and 4b are sectional views of an second embodiment of the sensor electrodes;

FIGS. 5a and 5b are sectional views of a sensor having a tapered housing;

FIG. 6 is a perspective view of a third embodiment of the sensor housing and electrodes;

FIGS. 7-9 are schematic representations of various amplifier configurations for combining the electrical signals generated by the sensor electrodes to produce an average flow velocity output signal;

DETAILED DESCRIPTION

Figure 1:
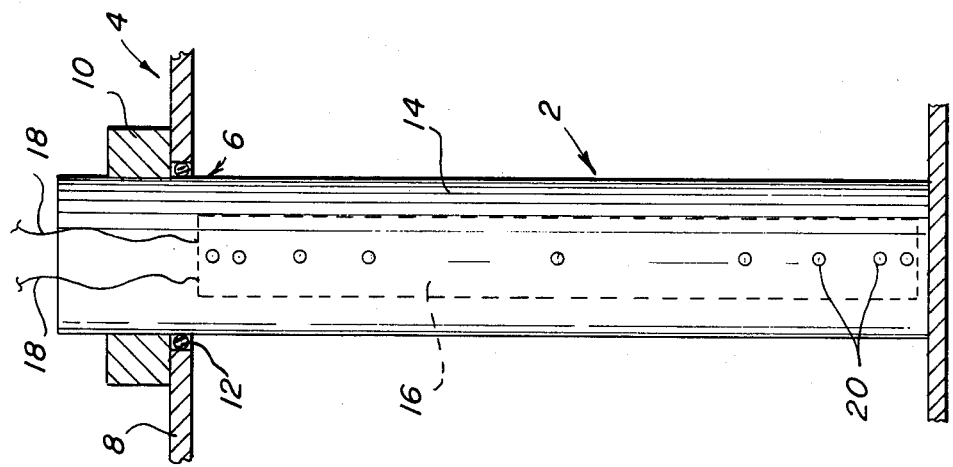
FIG. 1 is a partial sectional view illustrating the averaging velocity sensor according to the invention mounted in a conduit.

As shown in FIGS. 1 and 3, the present invention relates to a sensing device 2 used for measuring the average velocity of fluid flow in a cylindrical conduit 4.

In a preferred embodiment, the sensing device is of the probe type which passes through an opening 6 cut or drilled in the conduit wall 8. A valve member 10 including a seal 12 permanently mounts the sensing device 2 within the interior of the conduit.

The sensing device includes a tubular housing 14 which is preferably formed of a synthetic plastic material. The housing preferably extends along the diameter of the conduit completely across the interior thereof as shown in FIG. 1. The housing is configured so as to minimize the impedance to fluid flow in the conduit. As shown in FIGS. 3b and 4b, the housing may be cylindrical having a circular cross-sectional configuration. Alternatively, as shown in FIGS. 5a and 5b, the housing 114 may have a tapered, streamlined configuration in the direction of fluid flow.

A magnet, and preferably an electromagnet 16 is arranged with the housing 14 as shown in FIGS. 1, 3a, 4a, 5a and 9. A pair of wires 18 connect the coil (not shown) of the electromagnet with an external current source (not shown) in a conventional manner. The electromagnetic field F generated in the fluid by the internal electromagnet 16 has an axis which extends normal to direction of fluid flow.

A plurality of electrodes such as "button" electrodes 20 are arranged adjacent or embedded in the outer surface of the housing 14. As shown in the drawing, the electrodes are arranged in spaced relation along lines extending parallel to the housing axis and along the length thereof. As shown more particularly in FIGS. 3a and 3b, the electrodes are arranged in diametrically opposed pairs relative to the housing 14, with a line passing through each of the opposed pairs being arranged perpendicular to the direction of flow. As fluid flows through the electromagnetic field, each electrode produces an electrical signal as a function of the velocity of fluid flow adjacent thereto. Thus, a plurality of discrete fluid flow velocity signals are generated simultaneously at a plurality of locations across the area of the conduit.

Figure 2:
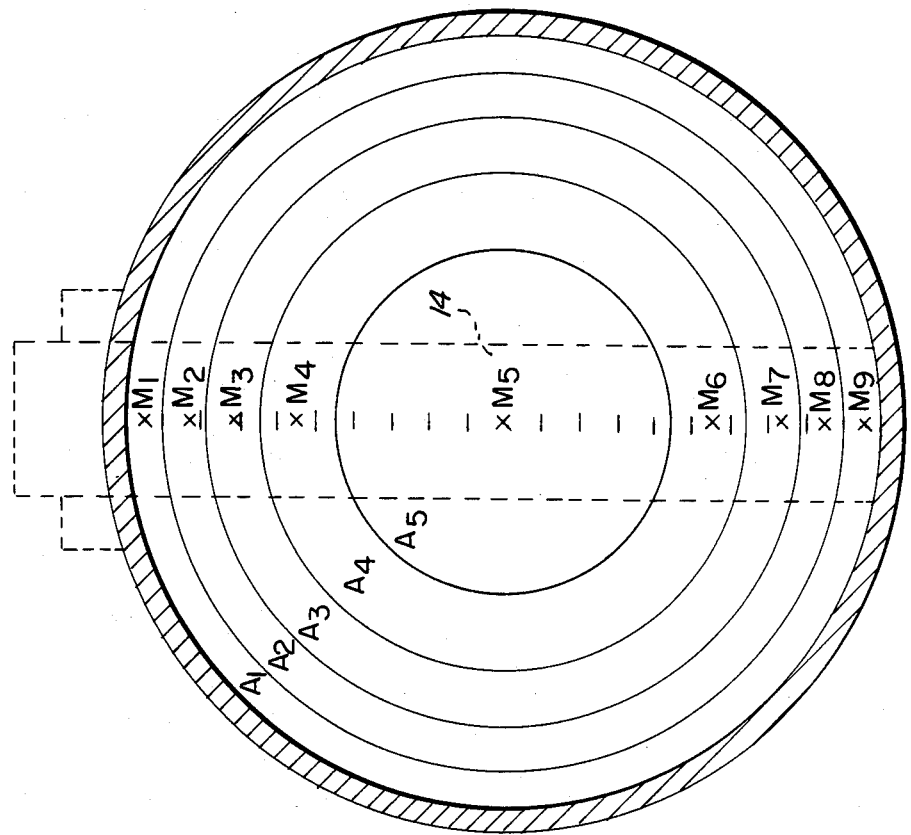
FIG. 2 is a cross-sectional view of a cylindrical conduit illustrating the interior thereof divided into annular segments of equal area.

In a preferred arrangement, the spacing between adjacent electrode pairs varies as a function of the number of electrode pairs provided on the housing. The cross sectional area of the conduit is divided into a number N of concentric annular segments of equal size according to the equation $$N = (X+1) \div 2$$

where X equals the number of electrode pairs. Thus, for example, where nine electrode pairs are provided as shown in the drawing, five segments $A_1-A_5$ of equal area are defined in the cross-sectional area of the conduit as shown in FIG. 2. The electrode pairs are spaced along the length of the housing 14 so that the center electrode $M_5$ is centrally arranged in the center of segment $A_5$ and the electrodes to either side of the center electrode are centrally arranged in the concentric segments $A_4$, $A_3$, $A_2$, and $A_1$, respectively. Thus for a conduit having a known diameter, the length of the housing and the distribution of the desired number of electrode pairs along the length thereof can be predetermined, whereby each sensing device can be preconfigured for the conduit of known diameter. The distribution of electrodes along the length of the housing in this fashion as shown in FIGS. 1, 2, 3a, 4a, and 5a provides an accurate indication of flow profile across the entire area of the conduit and is thus sensitive to changes in flow profiles to provide an accurate flow output signal.

Referring now to FIG. 7, one design for processing the discrete fluid flow signals generated by the individual electrodes is shown. One electrode 20a of each pair of electrodes has its output connected in series with the other one electrode 20a of each pair on the same side of the housing 14 to combine the electrical signals therefrom. The combined signals are delivered to one input of an amplifier S. The other electrodes 20b of each pair on the opposite side of the housing 14 also have their outputs connected in series for delivery of the combined signals therefrom to the other input of the amplifier S. The amplifier combines and compares the voltage V from the discrete electrical signals to provide an output signal corresponding with the average flow velocity within the conduit since the electrode pairs measure the local velocity for equal annular areas.

In the alternate arrangement of FIG. 8, separate amplifiers $S_1-S_9$ are provided for each electrode pair. One electrode of each pair delivers its electrical signal to one input of the corresponding amplifier and the other electrode of each pair delivers its electrical signal to the other input of the corresponding amplifier. The amplifiers compare the voltages of the input electrical signals and deliver an output signal to an adder 22 which produces the mean flow velocity output signal. This signal is delivered to a scaling amplifier $G_F$ which is scaled to the area of the conduit. The output from the amplifier $G_F$ corresponds to volumetric flow rate.

In the alternate embodiment of FIG. 9, the electrode pairs are evenly spaced along the length of the housing 14, whereby the areas of the annular segments which contain the electrode pairs are unequal. Using this configuration, the gain $G_1$–$G_9$ of each amplifier $S_1$–$S_9$ is adjusted to compensate for the different areas being measured.

Figure 10:
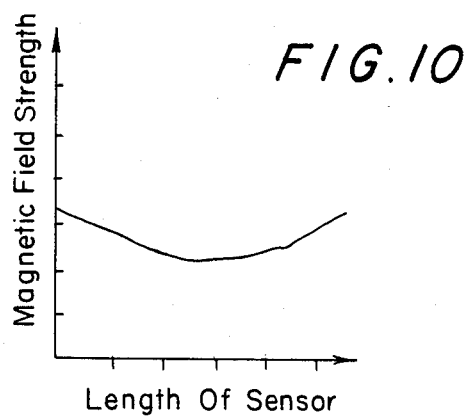
FIG. 10 is a graphical representation of the variable magnetic field strength generated by the sensor of FIG. 9.

In a further alternative embodiment having equally spaced electrode pairs, the electromagnet 116 may be tapered as shown in phantom in FIG. 9 to produce an electromagnetic field whose strength is greater at the ends of the housing and lesser at the middle of the housing as shown in FIG. 10, such that voltages generated by the electrodes are proportional to annulus areas. Using a tapered electromagnet eliminates the need for gain adjustment of the amplifiers, whereby the amplifier configurations of FIGS. 7 and 8 may be used.

Referring now to FIG. 4a, an alternate electrode arrangement is shown. The housing 14 of the sensor contains a plurality of pairs of openings 24 in desired locations either equally spaced as discussed with regard to the electrode arrangement shown in FIG. 9 or spaced so that the openings are centrally arranged in the annular areas of equal size as discussed with regard to the electrode arrangements shown in FIGS. 1, 2, 3a, 5a, 7, and 8. In lieu of separate button electrodes, a pair of electrode rods 26 formed of a conductive material are arranged within the housing on opposite sides thereof. As shown in FIG. 4a, the rods extend parallel to the housing axis and are arranged adjacent the openings of each pair of openings, respectively. The portion of each rod adjacent an opening functions as the equivalent to the button electrodes as discussed above. It will be appreciated that each rod thus accumulates the electrical signals generated by the "series connected" portions thereof adjacent the openings on each side of the housing. The outputs of each rod are connected with the separate inputs of an amplifier similar to the configuration shown in Fig. 7 to produce an average flow velocity output signal.

The rods 26 are preferably rotatably and removably connected with the housing such as for example by bearings (not shown). The rods may protrude from the conduit for connection with a rotating device 28 which may either continuously or intermittently rotate the rods about their axes, respectively. Alternatively, the rods may be rotated by hand. Rotation of the rods is particularly beneficial to insure that the clean portion of the rod faces each opening. When used in dirty fluids, the electrodes have a tendency to become worn during use. With the design of FIG. 4a, the worn portions of the rod may be rotated away from the openings, thereby exposing a clean rod portion without interrupting the flow measurements being made. When the rods have become completely contaminated, they may easily be removed and cleaned or replaced with clean rods. Thus the only down time of the device is that during which the rods are being removed for cleaning or replacement.

An alternate embodiment using rods for the electrodes is shown in FIG. 6. In this embodiment, the housing 214 contains a pair of opposed vertical slots 224 in lieu of the openings 24 provided in the housing of the embodiment shown in FIG. 4a. The slots are configured with an outer diameter slightly greater than the rods 226, whereby each rod may be arranged within a corresponding slot. The rods 226 are covered with a layer of insulation 230, but for selected portions 232 of the rods which are exposed directly to the fluid flow. The exposed portions of the rods may either be equally spaced as discussed with regard to the electrode arrangement shown in FIG. 9 or spaced so that the openings are centrally arranged in the annular areas of equal size as discussed with regard to the electrode arrangements shown in FIGS. 1, 2, 3a, 5a, 7, and 8. The exposed portions 232 of the electrode rods 226 thus function in the same manner as the button electrodes as dicussed above. As in the embodiment shown in FIG. 4a, an electromagnet (not shown) is provided within the housing 214 and the rods 226 are rotatably and removably connected with the housing.

The sensor according to the invention may also be used as a spool-type device as shown in FIGS. 11a–11e. The spool 30 comprises a cylindrical support 32 which is used to join two segments of a cylindrical conduit, the support having an inner diameter corresponding with the inner diameter of the conduit. Fluid communication is thus afforded between the conduits via the spool member 30.

Figure 11A:
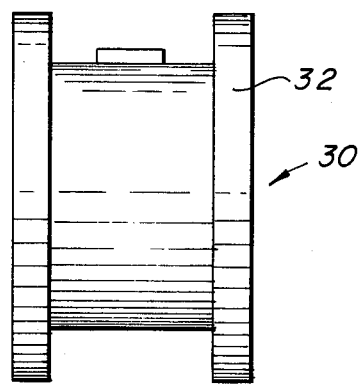
FIGS. 11a-11f illustrate various sensor housing configuration mounted on a spool according to an alternate embodiment of the invention.
Figure 11B:
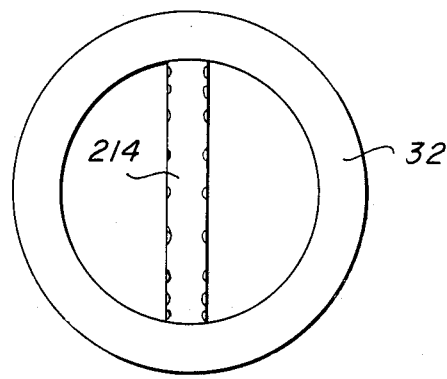
Figure 11C:
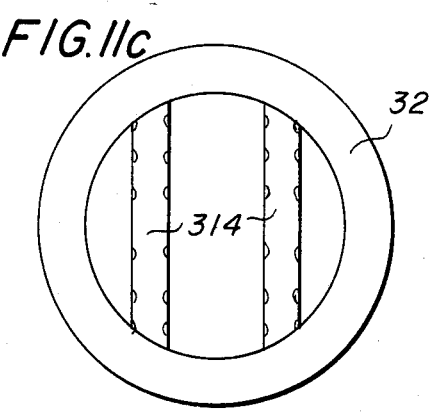
Figure 11D:
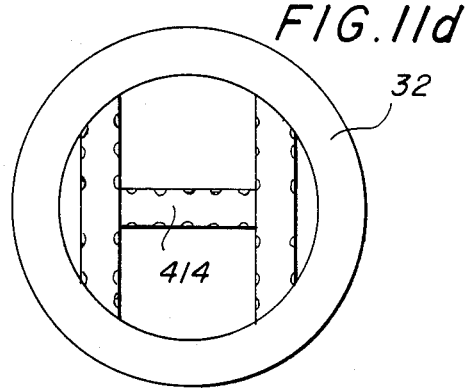
Figure 11E:
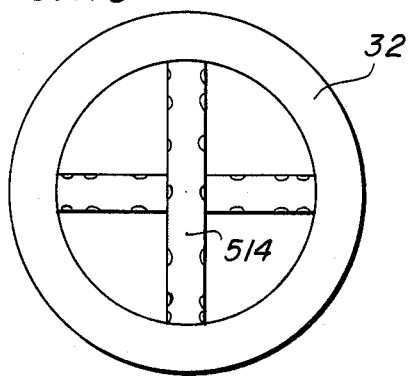
Figure 11F:
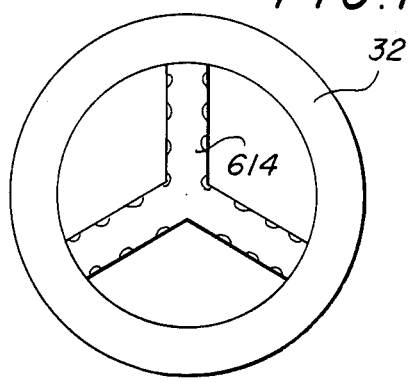

The sensor housing 14 is connected with the support. As in the probe type device, the sensor housing contains an electromagnet and includes a plurality of electrode pairs in any of the configurations set forth above. The housing 214 preferably is arranged along the diameter of the support 32 as shown in FIG. 11b. Alternatively, a pair of identical housings 314 may be arranged on chords extending across the interior of the cylindrical support 32 as shown in FIG. 11c. The housing 414, 514, 614 may also have H, cross, and Y shaped configurations as shown in FIGS. 11d, 11e, and 11f, respectively.

It will be appreciated by those skilled in the art that the present invention may also be used in "electrodeless" type electromagnetic or dielectric flowmeters wherein the electrodes are electrically shielded or insulated from the media whose flow is being determined. The use of an electrically driven shield for the electrodes eliminates the effects of capacitance on the electrodes and enables the detection of signals through an insulating wall.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. Apparatus for measuring the average velocity of fluid flow in a conduit, comprising
    (a) generally tubular housing means extending across the interior of the conduit;
    (b) magnet means arranged within said housing means for generating in the fluid a magnetic field the axis of which extends normal to the direction of fluid flow;
    (c) electrode means including a pair of parallel rods arranged adjacent the inner surface of said housing means and extending parallel to the axis of said housing means, said housing means containing a plurality of openings adjacent said rods, the portions of said rods adjacent said openings defining a plurality of electrodes arranged in spaced relation along the length of and adjacent the inner surface of said housing means, said electrodes including first and second electrodes arranged in diametrically opposed pairs relative to said housing means, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultaneously at a plurality of locations across the area of the conduit; and (d) amplifier means having first and second inputs connected with said first and second electrodes, respectively, for combining said electrical signals to produce an average flow velocity output signal.

2. Apparatus as defined in claim 1, wherein said magnet means comprises an electromagnet.

3. Apparatus as defined in claim 2, wherein the conduit has a circular cross-sectional configuration and further wherein said housing means is arranged along the diameter of the conduit.

4. Apparatus as defined in claim 3, wherein said rods are removably connected with said housing means, whereby said rods may be cleaned or replaced after they become dirty or contaminated through use.

5. Apparatus as defined in claim 4, wherein said rods are rotatably connected with said housing means, whereby a clean, unused portion of said rods may be arranged adjacent said housing openings upon rotation of said rods.

6. Apparatus as defined in claim 5, and further comprising rotating means connected with said rods for rotating said rods relative to said housing means.

7. Apparatus as defined in claim 6, wherein said housing means has a streamlined configuration in the direction of fluid flow.

8. Apparatus for measuring the average velocity of fluid flow in a conduit, comprising (a) generally tubular housing means extending across the interior of the conduit and containing a pair of vertical through-slots in the outer surface thereof;

(b) magnet means arranged within said housing means for generating in the fluid a magnetic field the axis of which extends normal to the direction of fluid flow;

(c) a pair of insulated electrode rods arranged in said slots, selected portions of said rods being free of insulation for exposure to the fluid flow to define a plurality of electrodes arranged in spaced relation along the length of and adjacent the outer surface of said housing means, said electrodes including first and second electrodes arranged in diametrically opposed pairs relative to said housing means, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultaneously at a plurality of locations across the area of the conduit; and (d) amplifier means having first and second inputs connected with said first and second electrodes, respectively, for combining said electrical signals to produce an average flow velocity output signal.

9. Apparatus as defined in claim 8, wherein said magnet means comprises an electromagnet.

10. Apparatus as defined in claim 9, wherein the conduit has a circular cross-sectional configuration and further wherein said housing means is arranged along the diameter of the conduit.

11. Apparatus as defined in claim 10, wherein said rods are removably and rotatably connected with said housing means.

12. Apparatus as defined in claim 11, and further comprising rotating means connected with said rods for rotating said rods relative to said housing means.

13. Apparatus as defined in claim 12, wherein said housing means has a streamlined configuration in the direction of fluid flow.

14. Apparatus for measuring the average velocity of fluid flow in a conduit of circular cross-sectional configuration, comprising (a) generally tubular housing means extending across the diameter of the conduit;

(b) magnet means arranged within said housing means for generating in the fluid a magnetic field the axis of which extends normal to the direction of fluid flow;

(c) electrode means including a plurality of electrodes arranged in spaced relation along the length of and adjacent the outer surface of said housing means, said electrodes being further arranged in diametrically opposed pairs relative to said housing means, said pairs of electrodes being arranged in concentric annular segments within the interior of said conduit, respectively, the cross-sectional area of each of said annular segments being equal, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultaneously at a plurality of locations across the area of the conduit; and (d) processing means connected with said electrode means for combining said electrical signals to produce an average flow velocity output signal.

15. Apparatus as defined in claim 14, wherein said housing means has a streamlined configuration in the direction of fluid flow.

16. Apparatus as defined in claim 15, and further comprising mounting valve means for mounting said housing means through an opening in the wall of the conduit.

17. Apparatus for measuring the average velocity of fluid flow in a conduit of circular cross-sectional configuration, comprising (a) generally tubular housing means extending across the diameter of the conduit;

(b) magnet means arranged within said housing means for generating in the fluid a magnetic field the axis of which extends normal to the direction of fluid flow;

(c) electrode means including a plurality of electrodes arranged in equally spaced relation along the length of and adjacent the outer surface of said housing means, said electrodes being further arranged in diametrically opposed pairs relative to said housing means, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultanously at a plurality of locations across the area of the conduit; and (d) processing means connected with said electrode means for combining said electrical signals to produce an average flow velocity output signal, said processing means including a plurality of gain-modified amplifiers corresponding in number with the number of electrode pairs, one electrode of each pair being connected with one input of said corresponding amplifier and the other electrode of each pair being connected with the other input of said corresponding amplifier, the gain of each amplifier being adjusted in accordance with the cross-sectional annular area of the conduit corresponding with the location of said corresponding pair of electrodes.

18. Apparatus as defined in claim 17, and further comprising adding means connected with the outputs of said amplifiers for producing a mean flow velocity signal.

19. Apparatus as defined in claim 18, and further comprising a scaling amplifier scaled to the area of the conduit and connected with said adding means for converting the mean flow velocity signal to a volumetric flow rate signal.

20. Apparatus as defined in claim 18, wherein said housing means has a streamlined configuration in the direction of fluid flow.

21. Apparatus for measuring the average velocity of fluid flow in a conduit of circular cross-sectional configuration, comprising (a) generally tubular housing means extending across the diameter of the conduit;

(b) magnet means arranged within said housing means for generating in the fluid a magnetic field the axis of which extends normal to the direction of fluid flow and the strength of which varies from a maximum at the ends of said housing means to a minimum at the middle of said housing means;

(c) electrode means including a plurality of electrodes arranged in equally spaced relation along the length of and adjacent the outer surface of said housing means, said electrodes being further arranged in diametrically opposed pairs relative to said housing means, said magnetic field strength corresponding with the cross-sectional annular areas of the conduit corresponding with the location of said pairs of electrodes, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultaneously at a plurality of locations across the area of the conduit; and (d) processing means connected with said electrode means for combining said electrical signals to produce an average flow velocity output signal.

22. Apparatus for measuring the average velocity of fluid flow in a conduit of a circular cross-sectional configuration, comprising (a) generally tubular housing means extending across the interior of the conduit;

(b) magnet means arranged within said housing means for generating in the fluid a magnetic field the axis of which extends normal to the direction of fluid flow;

(c) electrode means including a plurality of electrodes arranged in spaced relation along the length of and adjacent the outer surface of said housing means, said electrodes being further arranged in diametrically opposed pairs relative to said housing means, the lines passing through the pairs of electrodes being arranged perpendicular to the direction of fluid flow, said electrodes producing electrical signals in response to the flow of fluid through said magnetic field, each of said signals being a function of the velocity of fluid flow adjacent each of said electrodes, respectively, whereby a plurality of discrete fluid flow velocity signals are generated simultaneously at a plurality of locations across the area of the conduit;

(d) processing means connected with said electrode means for combining said electrical signals to produce an average flow velocity output signal; and (e) a generally cylindrical spool member having an inner diameter corresponding with the inner diameter of the conduit, said spool member being arranged between and affording fluid flow between segments of the conduit, said housing means being connected with said spool member.

23. Apparatus as defined in claim 22, wherein said housing means is arranged along the diameter of said spool member.

24. Apparatus as defined in claim 22, wherein said housing means has an H-shaped configuration.

25. Apparatus as defined in claim 22, wherein said housing means has a Y-shaped configuration.

26. Apparatus as defined in claim 22, wherein said housing means has a cross-shaped configuration.

27. Apparatus as defined in claim 22, wherein said housing means includes a pair of housings arranged along parallel chords of said spool member.

* * * * *